US012614875B2

(12) United States Patent
Tung et al.

(10) Patent No.: US 12,614,875 B2
(45) Date of Patent: Apr. 28, 2026

(54) ELECTRICAL CONNECTOR HAVING TERMINALS WITH MULTIPLE CONTACT PORTIONS

(71) Applicant: Delta Electronics, Inc., Taoyuan City (TW)

(72) Inventors: Nien-Wei Tung, Taoyuan City (TW); Jing-Xian Shi, Taoyuan City (TW)

(73) Assignee: Delta Electronics, Inc., Taoyuan City (TW)

( * ) Notice: Subject to any disclaimer, the term of this patent is extended or adjusted under 35 U.S.C. 154(b) by 285 days.

(21) Appl. No.: 18/243,785

(22) Filed: Sep. 8, 2023

(65) Prior Publication Data

US 2024/0421532 A1 Dec. 19, 2024

(30) Foreign Application Priority Data

Jun. 14, 2023 (CN) ......................... 202310704397.1

(51) Int. Cl.

*H01R 13/58* (2006.01)
*H01R 13/24* (2006.01)
*H01R 13/506* (2006.01)

(52) U.S. Cl.

CPC ..... *H01R 13/5812* (2013.01); *H01R 13/2414* (2013.01); *H01R 13/506* (2013.01)

(58) Field of Classification Search

None

See application file for complete search history.

(56) References Cited

U.S. PATENT DOCUMENTS

| | | | | |
|---|---|---|---|---|
| 943,798 | A | 12/1909 | Mclane et al. | |
| 3,858,957 | A * | 1/1975 | Harwood | H01R 12/82 439/267 |
| 4,487,464 | A | 12/1984 | Kirschenbaum | |
| 6,217,347 | B1 | 4/2001 | Schell et al. | |
| 9,537,261 | B2 | 1/2017 | Chen et al. | |
| 10,170,845 | B2 | 1/2019 | Ju | |
| 10,971,863 | B1 * | 4/2021 | Wu | H01R 13/115 |
| 11,228,137 | B2 | 1/2022 | Xu et al. | |
| 11,495,926 | B2 | 11/2022 | Chang et al. | |
| 2013/0095673 | A1 * | 4/2013 | Brandon | H01R 43/16 439/55 |
| 2017/0070015 | A1 * | 3/2017 | Chen | H01R 13/502 |
| 2017/0133781 | A1 | 5/2017 | Duan et al. | |
| 2020/0014158 | A1 | 1/2020 | Chien et al. | |

(Continued)

FOREIGN PATENT DOCUMENTS

| | | |
|---|---|---|
| CN | 107039807 A | 8/2017 |
| CN | 208539159 U | 2/2019 |

(Continued)

*Primary Examiner* — Oscar C Jimenez
(74) *Attorney, Agent, or Firm* — KIRTON McCONKIE; Evan R. Witt

(57) ABSTRACT

An electric connector includes a casing and a plurality of terminals. The casing has an accommodating space, and the plurality of terminals are arranged in the accommodating space. Each terminal has a main body, an upper arm and a lower arm. The upper arm and the lower arm are symmetrically connected to the main body. The upper arm and the lower arm respectively have free ends, first contact portions and second contact portions, and the first contact portions are disposed at the free ends, respectively.

8 Claims, 6 Drawing Sheets

(56) References Cited

U.S. PATENT DOCUMENTS

| | | | | |
|---|---|---|---|---|
| 2020/0358210 | A1* | 11/2020 | Bogen | F01N 13/18 |
| 2021/0091500 | A1 | 3/2021 | Chang et al. | |
| 2021/0091523 | A1 | 3/2021 | Chang et al. | |
| 2024/0356274 | A1* | 10/2024 | Wang | H01R 13/03 |
| 2024/0364061 | A1* | 10/2024 | Wang | H01R 13/112 |

FOREIGN PATENT DOCUMENTS

| | | | |
|---|---|---|---|
| CN | 208723144 | U | 4/2019 |
| CN | 110729583 | B | 8/2021 |
| CN | 215221073 | U | 12/2021 |
| CN | 111987506 | B | 2/2022 |
| CN | 217468879 | U | 9/2022 |
| KR | 20100070954 | A | 6/2010 |
| TW | 201405951 | A | 2/2014 |
| TW | I469730 | B | 1/2015 |
| TW | M506400 | U | 8/2015 |
| TW | 201705631 | A | 2/2017 |
| TW | M542261 | U | 5/2017 |
| TW | M554235 | U | 1/2018 |

* cited by examiner

ELECTRICAL CONNECTOR HAVING TERMINALS WITH MULTIPLE CONTACT PORTIONS

CROSS-REFERENCE TO RELATED APPLICATION

This application claims priority to China Patent Application No. 202310704397.1, filed on Jun. 14, 2023. The entire contents of the above-mentioned application are incorporated herein by reference for all purposes.

FIELD OF THE INVENTION

The present disclosure relates to an electric connector, and more particularly to an electric connector having terminals with a plurality of contact portions.

BACKGROUND OF THE INVENTION

Electric connectors are widely used in electronic equipment in newly days as an interface for power and signal transmission. However, with rapid development of technology, in order to respond to different kinds, types, or brands of electronic equipment, electric connectors of various types and specifications are flourished. For example, the most commonly used connection interface by public is the Universal Serial Bus (USB) connector assembly. Users can plug some peripheral devices with USB male plugs, such as mice, external hard disks, mobile power supplies, etc., into the electronic devices with USB female sockets, so as to achieve electrical connection between the peripheral devices and the electronic device to transmit power and signals, and the peripheral devices can play various functions respectively.

With the increase demand in transmission amounts, transmission rate, and performance requirements, the high-speed TYPE-C specification electric connector assembly of USB is introduced. The USB TYPE-C electric connector assembly has smaller size than the traditional USB interfaces, but can support higher power charging and power supply capability, and faster in transmission speed. In addition, it can support front and back plugging, so that users no longer need to distinguish the front and back side, and it is more suitable for using in modern electronic devices that pursue thinness and lightness.

However, in the prior art, the size of the connection interfaces of USB TYPE-C electric connector assembly are smaller, and there is only one set of contact points at the coupling ends of the internal male and female contact terminals to form electrical connection, which cause the contact area is limited. Meanwhile, due to the limited contact area, when they are charged, it is easy to cause an excessively high temperature rise and difficult to increase the charging current value, so that the charging performance is also affected. FIG. 1 is a schematic exploded view perspective view illustrating a male electric connector of the prior art. As shown in FIG. 1, the prior art male electric connector 1 includes a casing 10 and a plurality of prior art terminals 11, wherein the casing 10 has an accommodating space 100, and the plurality of prior art terminals 11 are arranged in the accommodating space 100 of the casing 10. The prior art terminal 11 has an upper arm 12*a* and a lower arm 12*b*, when the prior art male electric connector 1 couples with another female electric connector (not shown), the contact portions 11*a*, 11*b* of the upper arm 12*a* and the lower arm 12*b* of each prior art terminal 11 respectively clamp the contact terminal (not shown) of the female electric connector, so as to form an electrical connection. While, as mentioned above, due to the prior art terminals 11 of the prior art male electric connector 1 have only one set of contact portions 11*a*, 11*b* to clamp and contact the contact terminals in the female electric connector, the contact terminals of the female electrical connector are prone to friction and loss under the stress of repeated collisions of the contact portions 11*a*, 11*b* during the long-term plugging and unplugging processes. Moreover, due to the electrical connection is only formed by the single set of the contact portions 11*a*, 11*b*, the contact area is limited, resulting in high contact impedance, high temperature rise and difficult to increase the charging current value.

Therefore, there is a need of providing an electric connector to obviate the drawbacks encountered from the prior arts.

SUMMARY OF THE INVENTION

It is an object of the present disclosure to provide an electric connector, especially a USB TYPE-C electric connector assembly for charging. By arranging at least two sets of the contact portions on the terminals of the electric connector, the contact area between each other is increased, the temperature rise can be reduced when the rated current passes in charging, the current tolerance can be improved, and the charging current value and charging performance can also be increased.

It is another object of the present disclosure to provide an electric connector, especially a USB TYPE-C electric connector for charging. The electric connector includes a plurality of terminals, and each terminal has an upper arm and a lower arm. Through the adjustments of the ratio of the length, the thickness of the first elastic portions and the second elastic portions, so as to achieve the requirements of multi-contact clamping and the proper contact force. Consequently, the friction and loss of the tongue to be coupled with can also be decreased, and the service life of the product can be enlarged.

In accordance with an aspect of the present disclosure, there is provided an electric connector including a casing and a plurality of terminals. The casing has an accommodating space. The plurality of terminals are arranged in the accommodating space. Each terminal has a main body, an upper arm and a lower arm. The upper arm and the lower arm are symmetrically connected to the main body. The upper arm and the lower arm respectively have free ends, first contact portions and second contact portions, and the first contact portions are disposed at the free ends, respectively.

In an embodiment, each the upper arm and each the lower arm are connected to the main body through a connection end, and each the upper arm and each the lower arm are inclined from the connection end to the free end.

In an embodiment, a distance between the first contact portion of the upper arm and the lower arm is smaller than a distance between the second contact portion of the upper arm and the lower arm.

In an embodiment, each the upper arm and each the lower arm respectively have first elastic portions and second elastic portions, and the first contact portion is arranged at the free end of the first elastic portion, the second contact portion is arranged at a junction of the first elastic portion and the second elastic portion.

In an embodiment, the first elastic portion is a strip elastic structure.

In an embodiment, the first elastic portion is a curved elastic structure.

In an embodiment, a thickness of the second elastic portion is greater than or equal to a thickness of the first elastic portion.

In an embodiment, a length of the second elastic portion is greater than a length of the first elastic portion.

In an embodiment, each the upper arm and each the lower arm respectively have a third contact portion, and the third contact portion is disposed on the first elastic portion.

In an embodiment, the first contact portion, the second contact portion, and the third contact portion are protrusion structures.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2:
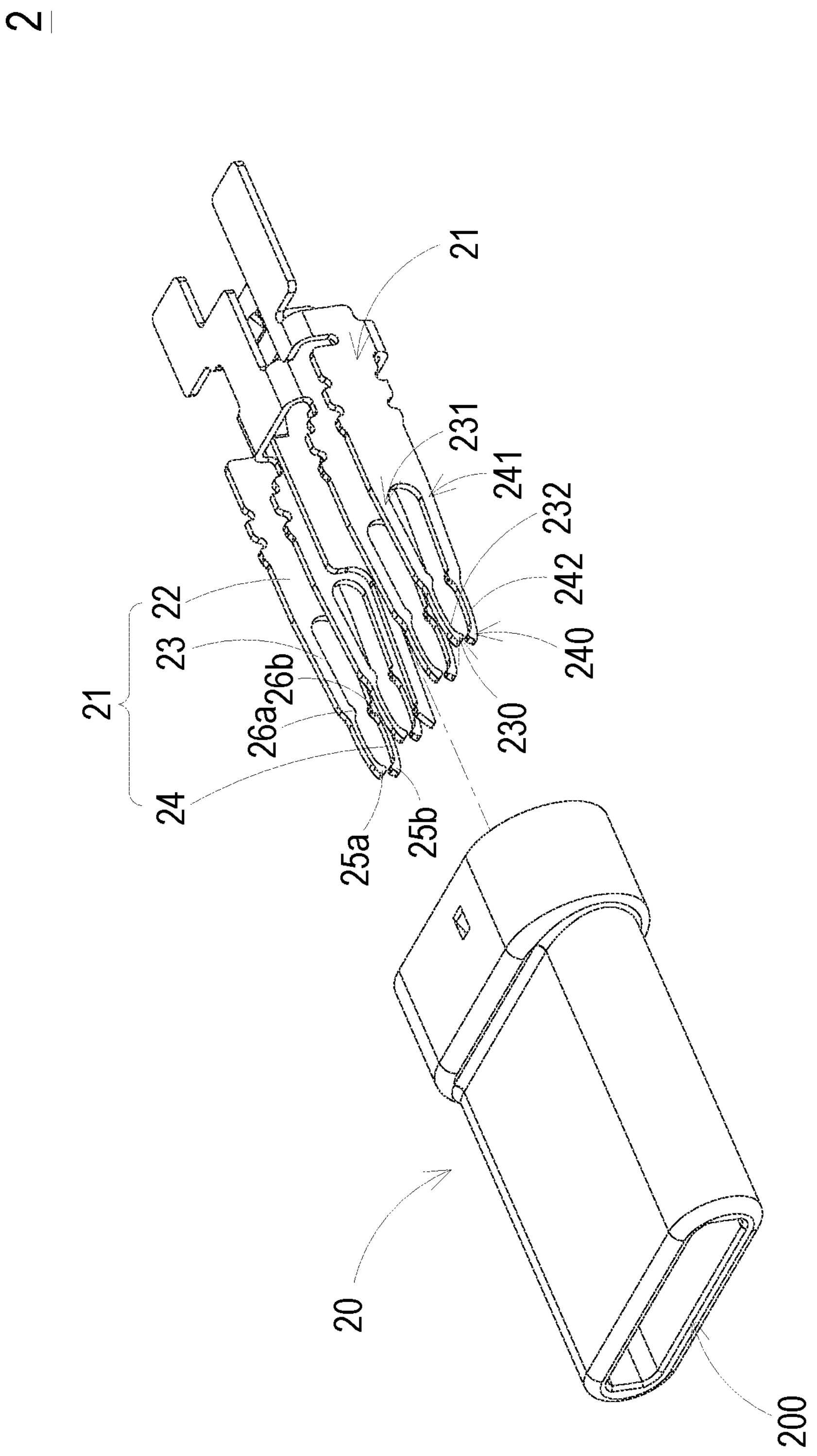
FIG. 2 is a schematic perspective view illustrating an electric connector according to an embodiment of the present disclosure.

FIG. 2 is a schematic perspective view illustrating an electric connector according to an embodiment of the present disclosure. In this embodiment, the electric connector 2 is a Universal Serial Bus (USB) connector, especially is a USB TYPE-C electric connector for charging. As shown in FIG. 2, the electric connector 2 is a male electric connector and includes a casing 20 and a plurality of terminals 21. The casing has an accommodating space 200. The plurality of terminals 21 are arranged in the accommodating space 200 of the casing 20. Each terminal 21 has a main body 22, an upper arm 23 and a lower arm 24, the upper arm 23 and the lower arm 24 are symmetrically connected to the main body 22. As shown in FIG. 2, the upper arm 23 and the lower arm 24 respectively have free ends 230, 240, first contact portions 25*a*, 25*b* and second contact portions 26*a*, 26*b*, and the first contact portions 25*a*, 25*b* are disposed at the free ends 230, 240, respectively. In some embodiments, the plurality of terminals 21 are made of elastic metal material, but not limited thereto.

Figure 4A:
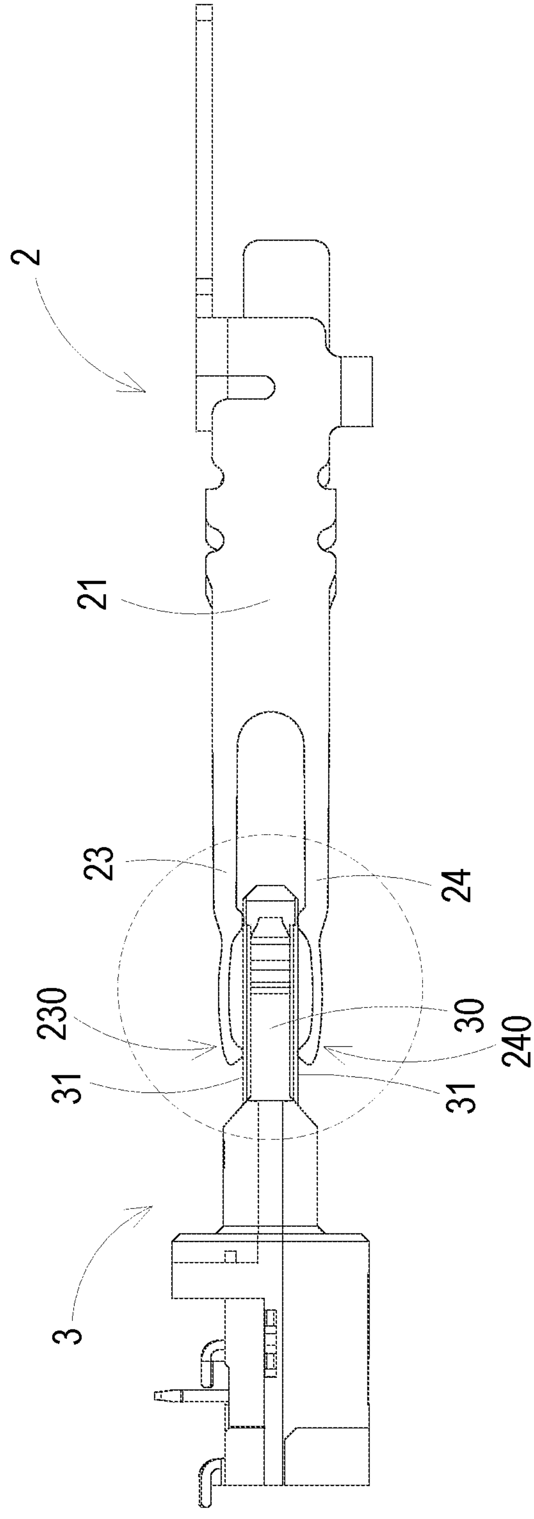
FIG. 4A is a schematic perspective view illustrating the terminal of the electric connector coupled with a contact terminal of another electric connector.

In this embodiment, each upper arm 23 of the terminal 21 has a free end 230 and a connection end 231, which are correspondingly arranged on two opposite ends of the upper arm 23, and the upper arm 23 is connected to the main body 22 through the connecting end 231. Similarly, each lower arm 24 has a free end 240 and a connection end 241 correspondingly arranged with each other, and is connected to the main body 22 through the connecting end 241. Moreover, in this embodiment, each upper arm 23 and each lower arm 24 are inclined from the connection end 231, 241 to the free end 230, 240. As shown in FIG. 2, the first contact portion 25*a* and the second contact portion 26*a* of the upper arm 23 are disposed on the lower surface 232 of the upper arm 23, and the first contact portion 25*a* is disposed at the free end 230. The first contact portion 25*b* and the second contact portion 26*b* of the lower arm 24 are disposed on the upper surface 242 of the lower arm 24, and the first contact portion 25*b* is disposed at the free end 240. In some embodiments, the positions of the first contact 25*a* and the second contact portion 26*a* of the upper arm 23 correspond to the first contact portion 25*b* and the second contact portion 26*b* of the lower arm 24, but not limited thereto. Consequently, in this embodiment, when the electric connector 2 is correspondingly connected with another electric connector 3 (as shown in FIG. 4A), the first contact portion 25*a* and the second contact portions 26*a* disposed on the lower surface 232 of the upper arm 23 and the first contact portion 25*b* and the second contact portion 26*b* disposed on the upper surface 242 of the lower arm 24 respectively clamp the upper surface 300 and the lower surface 301 of the tongue 30, thereby the electric connector 3 is tightly clamped by the electric connector 2, so as to form an electrical connection.

Figure 1:
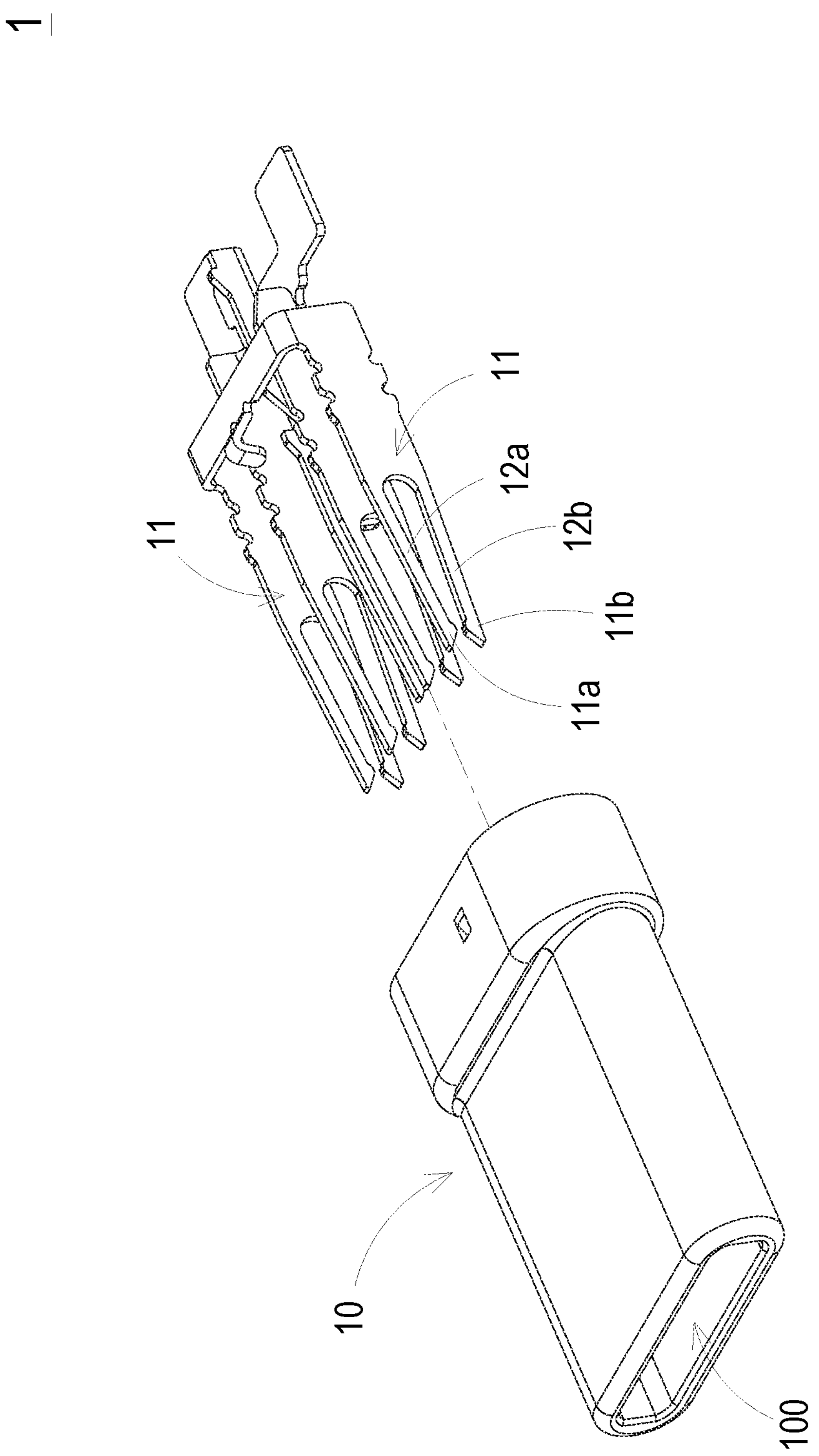
FIG. 1 PRIOR ART
FIG. 1 is a schematic exploded view perspective view illustrating a male electric connector of the prior art.
Figure 3:
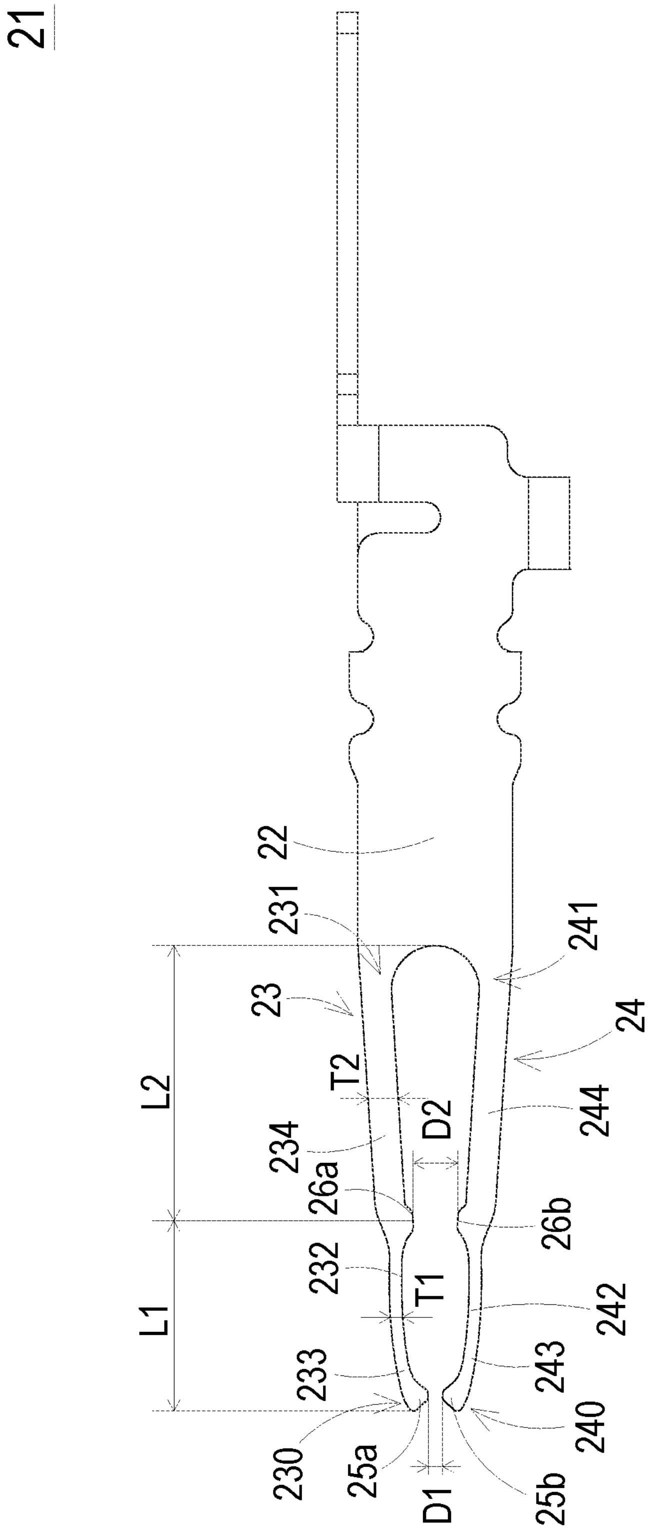
FIG. 3 is a schematic lateral view illustrating a terminal of the electric connector of FIG. 1.

Please refer to FIG. 2 and FIG. 3. FIG. 3 is a schematic lateral view illustrating a terminal of the electric connector of FIG. 1. In the embodiment, the upper arm 23 and the lower arm 24 of the terminal 21 are elastic arm structures with the same structure and arranged symmetrically to each other. As shown in FIG. 3, the upper arm 23 has a first elastic portion 233 and a second elastic portion 234. In other words, in the embodiment, a moveable portion of the upper arm 23 can be divided into the first elastic part 233 connected with the free end 230 and the second elastic part 234 connected with the connecting end 231. Moreover, the first contact portion 25*a* disposed on the lower surface 232 of the upper arm 23 is arranged at the free end 230 of the first elastic portion 233, and the second contact portion 26*a* is arranged at a junction of the first elastic portion 233 and the second elastic portion 234. Similarly, the lower arm 24 also has a first elastic portion 243 and a second elastic portion 244 which are arranged symmetrically with the upper arm 23, and the first contact portion 25*b* disposed on the upper surface 242 of the lower arm 24 is arranged at the free end 240 of the first elastic portion 243, and the second contact portion 26*b* is also arranged at a junction of the first elastic portion 243 and the second elastic portion 244.

As mentioned above, the upper arm 23 is inclined from the connection end 231 to the free end 230. Accordingly, in the embodiment, a distance D1 between the first contact portion 25*a* of the upper arm 23 and the first contact portion 25*b* of the lower arm 24 is smaller than a distance D2 between the second contact portion 26*a* of the upper arm 23 and the second contact portion 26*b* of the lower arm 24. In some embodiments, a thickness T2 of the second elastic portion 234, 244 of the upper arm 23 and the lower arm 24 is greater than or equal to a thickness T1 of the first elastic portion 233, 243, but not limited thereto. In other embodiments, a length L2 of the second elastic portion 234, 244 of the upper arm 23 and the lower arm 24 is greater than a length L1 of the first elastic portion 233, 243, but not limited thereto. In the embodiment, due to the thickness or length tapered from the second elastic portion 234, 244 to the first elastic portion 233, 243, the clamping and contact force of the first contact portion 25*a*, 25*b* and the second contact portion 26*a*, 26*b* can be adjusted and distributed. Consequently, the effects of multi-contact clamping, increasing contact area, reducing impedance and increasing the rated current value are achieved. While, the ratio of the length and the thickness of the first elastic portion 233, 243 and the second elastic portion 234, 244 are not limited to the above embodiments, which can be adjustable according the practical requirement.

In some embodiments, in addition to having two sets of first contact portions 25*a*, 25*b*, and the second contact portions 26*a*, 26*b*, the terminal 21 can also be provided with a set of third contact portions (not shown) according to the practical requirement. The first contact portions 25*a*, 25*b*, the second contact portions 26*a*, 26*b*, and the third contact portions are protrusion structures, and the appearance can be but not limited to be an arc-shaped protrusion structure. Moreover, in other embodiments, the third contact portions can be but not limited to be disposed on the first elastic portion 233, 243. Namely, the positions of the third contact portions are disposed between the two sets of first contact portions 25*a*, 25*b* and the second contact portions 26*a*, 26*b*, but not limited thereto, which can be adjustable according the practical requirement to achieve the requirement of multi-contact clamping.

Figure 4B:
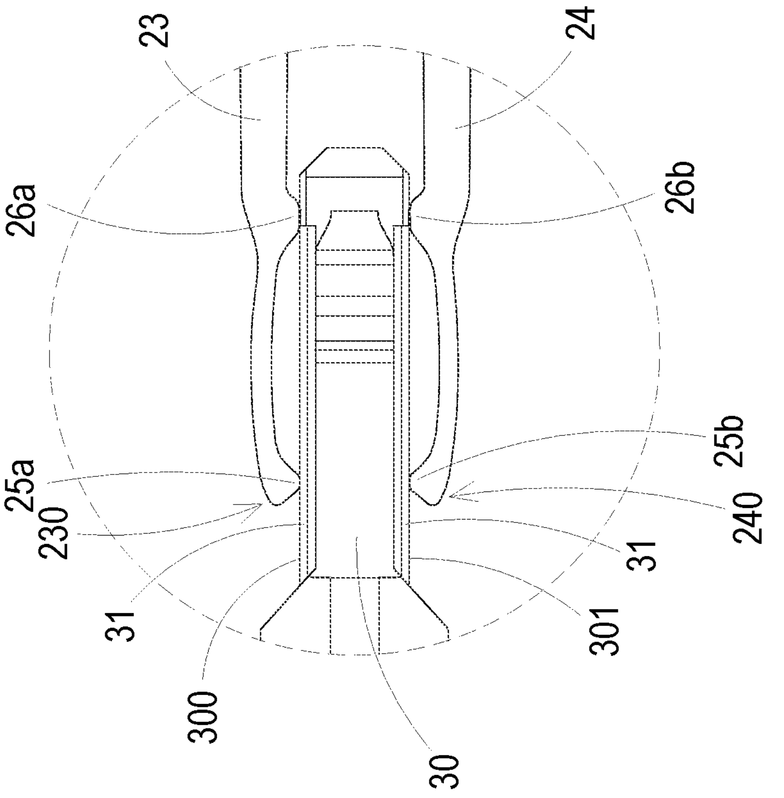
FIG. 4B is a partial enlargement schematic view of FIG. 4A.

Please refer to FIG. 4A and FIG. 4B. FIG. 4A is a schematic perspective view illustrating the terminal of the electric connector coupled with a contact terminal of another electric connector. FIG. 4B is a partial enlargement schematic view of FIG. 4A. As shown in FIGS. 4A and 4B, in this embodiment, the electric connector 2 is correspondingly connected with another electric connector 3. For more clearly illustrate the internal docking state of the electric connector 2 and the electric connector 3, the housing 20 of the electric connector 2 and the housing of the electric connector 3 are ignored in FIG. 4A and FIG. 4B. In the embodiment, the electric connector 2 is male electric connector, when it couples with the female electric connector 3, in response to the pushing force by the user, the tongue 30 of the female electric connector 3 moves in parallel towards the plurality of terminals 21 of the electric connector 2. The free ends 230, 240 of the upper arm 23 and the lower arm 24 of the plurality of terminals 21 are firstly touched and pushed, and then elastically moved up and down in accordance with the pushing force, respectively. The tongue 30 remains to move in parallel until the upper arm 23 and the lower arm 24 of the plurality of terminals 21 respectively clamp the upper surface 300 and the lower surface 301 of the tongue 30 disposed inside the female electric connector 3. Meanwhile, the first contact 25*a* and the second contact 26*a* disposed on the lower surface 232 of the upper arm 23 both contact with the contact terminals 31 disposed on the upper surface 300 of the tongue 30, thereby forming an electrical connection. Similarly, the first contact 25*b* and the second contact 26*b* disposed on the upper surface 242 of the lower arm 24 both contact with the contact terminals 31 disposed on the lower surface 301 of the tongue 30, so as to form an electrical connection. Consequently, when the electric connector 2 is correspondingly connected with the electric connector 3, the plurality of terminals 21 of the electric connector 2 can electrically couple with the contact terminals 31 of the electric connector 3 through the at least two sets of first contact portions 25*a*, 25*b*, and the second contact portions 26*a*, 26*b*, the terminal 21. Consequently, by means of this multi-contact clamping manners, not only can the overall clamping force be effectively increased, making it more stable after plugging, but also can increase the contact area between each other, thereby reducing impedance and improving current tolerance, so as to improve the charging current value and charging performance. Besides, due to the contact area is increased, the contact pressure of each contact portion is also decreased, so that the friction and loss of the tongue 30 can also be decreased, and the service life of the product can be enlarged.

Figure 5A:
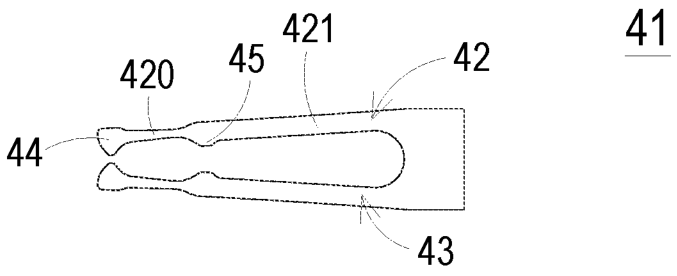
FIGS. 5A to 5D are schematic perspective views illustrating electric connectors according to second to fifth embodiments of the present disclosure.
Figure 5B:
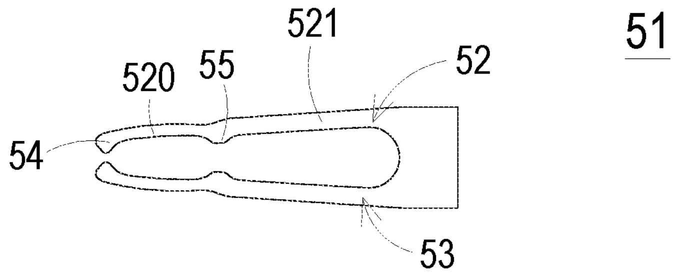
Figure 5C:
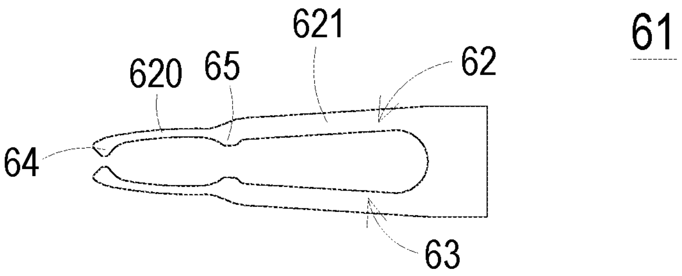
Figure 5D:
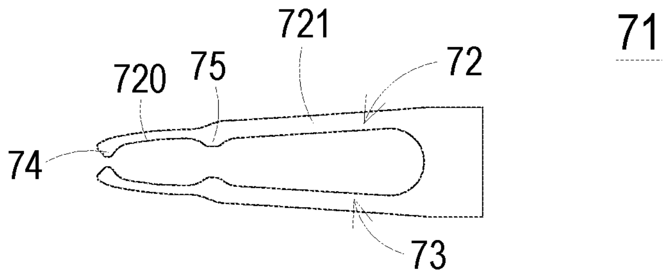

Please refer to FIGS. 5A to 5D. FIGS. 5A to 5D are schematic perspective views illustrating electric connectors according to second to fifth embodiments of the present disclosure. As shown in FIGS. 5A and 5D, the structures of the plurality of terminals 41, 51, 61, 71 are similar to the previous embodiment, and all of them include the upper arms 42, 52, 62, 72, the lower arms 43, 53, 63, 73, the first elastic portions 420, 520, 620, 720, the second elastic portions 421, 521, 621, 721, the first contact portions 44, 54, 64, 74, and the second contact portions 45, 55, 65, 75, since the arrangements and the positions are similar to the previous embodiment, which are not redundantly described herein. While in these four embodiments, the ratio of the thickness and the length of the first elastic portions 420, 520, 620, 720 and the second elastic portions 421, 521, 621, 721 are different from the previous embodiment. Moreover, in some embodiments, as shown in FIG. 5A, the first elastic portions 420 can be but not limited to be a strip elastic structure. In other embodiments, as shown in FIG. 5B, the first elastic portions 520 can be but not limited to be a curved elastic structure. Furthermore, the appearance of the first contact portions 44, 54, 64, 74 and/or the second contact portions 45, 55, 65, 75 can also be adjusted, which can be not only an arc-shaped protrusion structure, but also a slightly triangular or trapezoidal protrusion structure. In other words, the ratio of the length, the thickness of the first elastic portions 420, 520, 620, 720 and the second elastic portions 421, 521, 621, or the appearance and the arrangement of the first contact portions 44, 54, 64, 74 and the second contact portions 45, 55, 65, 75 are not limited to the above embodiments, which can be adjustable according the practical requirement to achieve the requirements of multi-contact clamping and the proper contact force.

From the above descriptions, the present disclosure provides an electric connector, and the electric connector is a USB TYPE-C electric connector assembly for charging. By arranging at least two sets of the contact portions on the terminals of the electric connector, the contact area between each other is increased, the temperature rise can be reduced when the rated current passes in charging, the current tolerance can be improved, and the charging current value and charging performance can also be increased. Moreover, through the adjustments of the ratio of the length, the thickness of the first elastic portions and the second elastic portions, so as to achieve the requirements of multi-contact clamping and the proper contact force. Consequently, the friction and loss of the tongue to be coupled with can also be decreased, and the service life of the product can be enlarged. By means of the multi-contact clamping manners, not only can the overall clamping force be effectively increased, making it more stable after plugging, but also can increase the contact area between each other, thereby reducing impedance and improving current tolerance, so as to improve the charging current value and charging performance. Besides, due to the contact area is increased, the contact pressure of each contact portion is also decreased, so that the friction and loss of the tongue to be coupled with can also be decreased, and the service life of the product can be enlarged.

While the disclosure has been described in terms of what is presently considered to be the most practical and preferred embodiments, it is to be understood that the disclosure needs not be limited to the disclosed embodiment.

What is claimed is:

1. An electric connector, comprising: a casing having an accommodating space; and a plurality of terminals arranging in the accommodating space, wherein each terminal has a main body, an upper arm and a lower arm, the upper arm and the lower arm are symmetrically connected to the main body, and the upper arm and the lower arm respectively have free ends, first contact portions and second contact portions, and the first contact portions are disposed at the free ends, respectively, wherein each the upper arm and each the lower arm respectively have first elastic portions and second elastic portions, and a thickness of the second elastic portion is greater than or equal to a thickness of the first elastic portion; wherein a distance between the first contact portion of the upper arm and the lower arm is smaller than a distance between the second contact portion of the upper arm and the lower arm.

2. The electric connector according to claim 1, wherein each the upper arm and each the lower arm are connected to the main body through a connection end, and each the upper arm and each the lower arm are inclined from the connection end to the free end.

3. The electric connector according to claim 1, wherein the first contact portion is arranged at the free end of the first elastic portion, the second contact portion is arranged at a junction of the first elastic portion and the second elastic portion.

4. The electric connector according to claim 1, wherein the first elastic portion is a strip elastic structure.

5. The electric connector according to claim 1, wherein the first elastic portion is a curved elastic structure.

6. The electric connector according to claim 1, wherein a length of the second elastic portion is greater than a length of the first elastic portion.

7. The electric connector according to claim 1, wherein each the upper arm and each the lower arm respectively have a third contact portion, and the third contact portion is disposed on the first elastic portion.

8. The electric connector according to claim 7, wherein the first contact portion, the second contact portion, and the third contact portion are protrusion structures.

* * * * *